United States Patent
Mukherjee et al.

(10) Patent No.: US 11,645,563 B2
(45) Date of Patent: May 9, 2023

(54) DATA FILTERING WITH FUZZY ATTRIBUTE ASSOCIATION

(71) Applicant: International Business Machines Corporation, Armonk, NY (US)

(72) Inventors: Sumanta Mukherjee, Bangalore (IN); Ashok Pon Kumar Sree Prakash, Bangalore (IN); Vijay Ekambaram, Chennai (IN); Surya Shravan Kumar Sajja, Bangalore (IN); Krishnasuri Narayanam, Bangalore (IN); Harshit Kumar, Delhi (IN); Amith Singhee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 16/830,931

(22) Filed: Mar. 26, 2020

(65) Prior Publication Data
US 2021/0304042 A1    Sep. 30, 2021

(51) Int. Cl.
*G06N 5/04*     (2023.01)
*G06N 5/048*    (2023.01)
(Continued)

(52) U.S. Cl.
CPC ............. *G06N 5/048* (2013.01); *G06N 5/025* (2013.01); *G06Q 30/0603* (2013.01);
(Continued)

(58) Field of Classification Search
CPC .......................... G06N 5/048; H04N 21/4826
See application file for complete search history.

(56) References Cited

U.S. PATENT DOCUMENTS 7,702,601 B2    4/2010   Boyle et al.
7,908,183 B2    3/2011   Jacobi et al.
(Continued)

FOREIGN PATENT DOCUMENTS

EP    3182362    6/2017

OTHER PUBLICATIONS

Ojokoh, B. A., et al. "A fuzzy logic based personalized recommender system." International Journal of Computer Science and Information Technology & Security (IJCSITS), 2, pp. 1008-1015, Oct. 2012.

(Continued)

*Primary Examiner* — Scott C Anderson
(74) *Attorney, Agent, or Firm* — Ryan, Mason & Lewis, LLP

(57) ABSTRACT

Methods, systems, and computer program products for data filtering with fuzzy attribute association are provided herein. A computer-implemented method includes obtaining one or more rules, specified by an expert, that define a partial ranking of a plurality of fuzzy pairings between (i) a plurality of item attributes for items in a data catalog and (ii) a plurality of user attributes related to said items; generating an interactive session with the expert to resolve one or more ambiguities in the one or more rules; and deriving a scoring function based at least in part on (i) the one or more rules and (ii) the resolved one or more ambiguities, wherein the scoring function generates a comparative score between any two items of said data catalog for a given one of the users associated with the plurality of attributes.

20 Claims, 7 Drawing Sheets

(51) Int. Cl.
  *G06Q 30/0601* (2023.01)
  *G06Q 50/00* (2012.01)
  *H04N 21/482* (2011.01)
  *G06N 5/025* (2023.01)
  *G06N 7/02* (2006.01)

(52) U.S. Cl.
  CPC ......... *G06Q 30/0631* (2013.01); *G06Q 50/01* (2013.01); *H04N 21/4826* (2013.01); *G06N 7/023* (2013.01)

(56) References Cited

U.S. PATENT DOCUMENTS

| | | | | |
|---|---|---|---|---|
| 10,241,752 | B2* | 3/2019 | Lemay | G06Q 30/02 |
| 2002/0103634 | A1* | 8/2002 | Ogmen | G06F 40/289 |
| | | | | 704/9 |
| 2013/0088490 | A1 | 4/2013 | Rasmussen et al. | |
| 2015/0019373 | A1 | 1/2015 | Carbonell et al. | |
| 2017/0213127 | A1* | 7/2017 | Duncan | G16B 50/30 |
| 2018/0233141 | A1* | 8/2018 | Solomon | G06V 40/23 |
| 2019/0384762 | A1* | 12/2019 | Hill | G06F 16/9535 |
| 2020/0089824 | A1* | 3/2020 | Linehan | G05B 13/04 |
| 2020/0151439 | A1* | 5/2020 | Johnson | G16H 30/20 |
| 2020/0184278 | A1* | 6/2020 | Zadeh | G06K 9/6264 |

OTHER PUBLICATIONS

Jain, Amita, and Charu Gupta. "Fuzzy Logic in Recommender Systems." Fuzzy Logic Augmentation of Neural and Optimization Algorithms: Theoretical Aspects and Real Applications. Springer, Cham. pp. 255-273. Jan. 2018.

Zenun Franco, Rodrigo. "Online Recommender System for Personalized Nutrition Advice." Proceedings of the Eleventh ACM Conference on Recommender Systems, Aug. 31, 2017.

Gu, Xiaoling, et al. "iglasses: A novel recommendation system for best-fit glasses" Proceedings of the 39th International ACM SIGIR cNPL4onference on Research and Development in Information Retrieval. 2016.

* cited by examiner

DATA FILTERING WITH FUZZY ATTRIBUTE ASSOCIATION

FIELD

The present application generally relates to information technology and, more particularly, to filtering of data with fuzzy attribute association.

BACKGROUND

Recommendation systems are computer-implemented techniques that identify a limited number of items (e.g., from a database) for a particular user. The identified items can then be displayed to the user via, for example, a graphical user interface. The relevance of the identified items to the user plays an important role in the overall user experience. For example, in the context of online shopping, product recommendation systems are widely used to provide customized product recommendations to improve the Internet browsing experience. Generally, such systems rely on a user's browsing history to provide content-based filtering. In these and other contexts, data of the user may be limited or restricted, thereby making the selection or filtering of items more difficult.

SUMMARY

In one embodiment of the present invention, techniques for data filtering with fuzzy attribute association are provided. An exemplary computer-implemented method includes the steps of obtaining one or more rules, specified by an expert, that define a partial ranking of a plurality of fuzzy pairings between (i) a plurality of item attributes for items in a data catalog and (ii) a plurality of user attributes related to said items; generating an interactive session with the expert to resolve one or more ambiguities in the at least one set of rules; and deriving a scoring function based at least in part on (i) the one or more rules and (ii) the resolved one or more ambiguities, wherein the scoring function generates a comparative score between any two items of said data catalog for a given one of the users associated with the plurality of attributes.

In another example of an embodiment, a computer-implemented method includes ranking, using a set of rules, pairs of (i) item attributes related to items in a data catalog and (ii) customer attributes related to said items, wherein one or more of the items have a fuzzy association with at least a portion of the item attributes; determining one or more logical issues in the ranking resulting from at least one of (i) the set of rules being incomplete and (ii) one or more ambiguities in the set of rules; generating output related to said one or more logical issues via a graphical user interface; resolving said one or more logical issues based on input from a user in response to said output; and deriving a scoring function based at least in part on said set of rules and said resolved one or more logical issues, wherein the scoring function generates a comparative score between any two items of said data catalog for a given set of values for the customer attributes.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
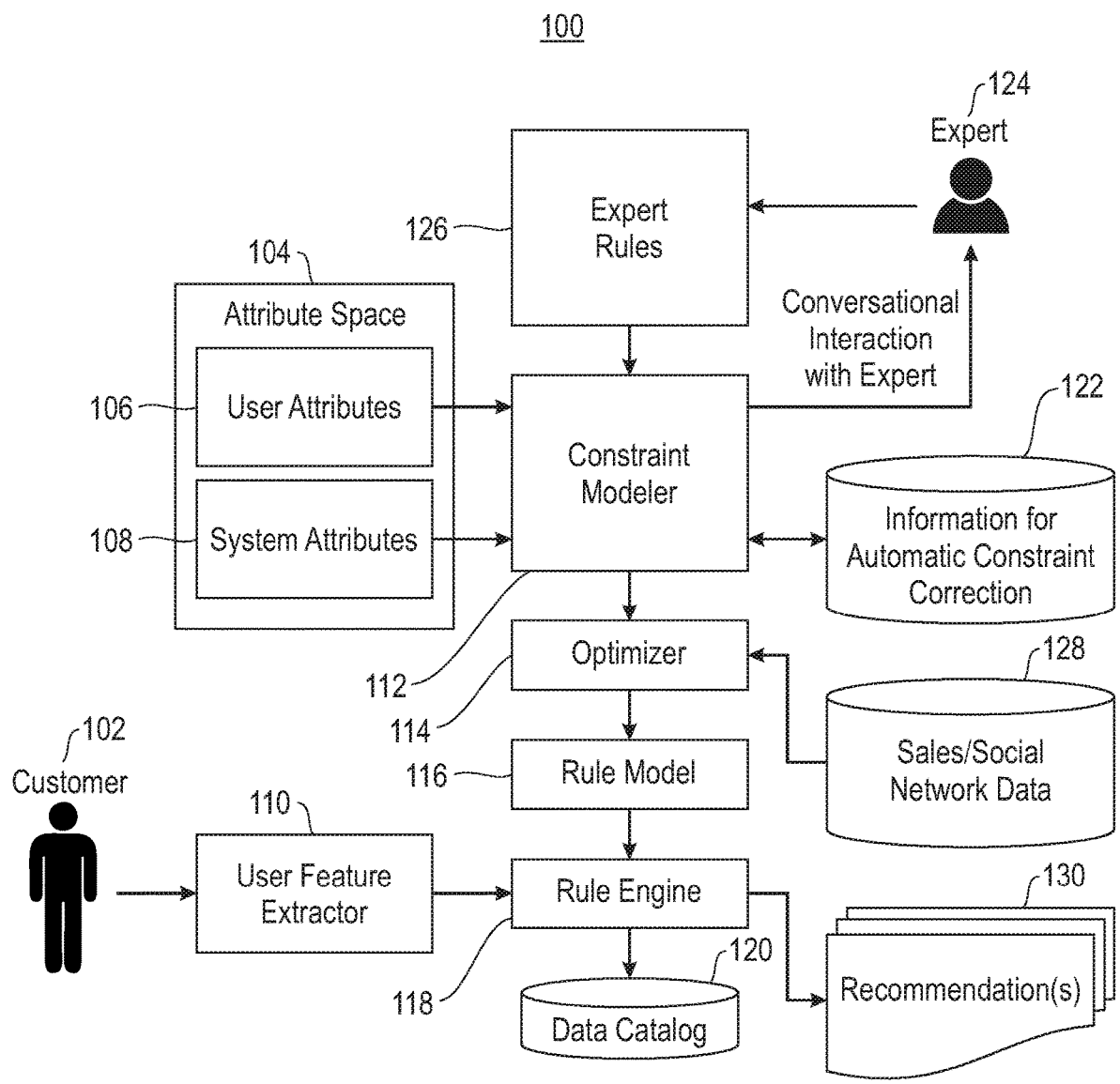
FIG. 1 is a diagram illustrating a system architecture, according to an exemplary embodiment of the invention.

As noted herein, user data are often insufficient and/or restricted which makes it difficult for recommendation systems to identify relevant items for a particular user. In some situations, it is often necessary to obtain expert recommendations when user data are restricted or limited. For example, in the fashion and jewelry domains, sales are trend driven and field experts are aware of current fashion trends. However, expert opinions tend to be incomplete and are not capable of producing unambiguous product recommendations under all conditions. Also, product catalogs are generally characterized using product attributes, whereas, a query from a user (e.g., interest, search, etc.) is generally characterized by user attributes. This difference causes problems in finding relevant products in the product catalog based on the user query.

Some existing techniques related to these challenges include creating a rule mapping file which exhaustively maps product attributes to user attributes. In some of these techniques, the mapping can be performed automatically when there is no fuzziness in the attribute association. However, user attributes are often derived using artificial intelligence (AI) attribution systems which introduce fuzziness. Generally, these automated techniques do not consider expert knowledge, which, as noted above, is often necessary for situations which data are limited or restricted.

By way of example, consider a scenario of a user visiting an online store seeking to purchase eye glasses. In order for the system to generate a product recommendation at least some of the following data are needed: facial features, hair style, gender, etc. If a user does not want to share browsing history, then some of these features may be estimated using other data, such as, for example, an uploaded photo or an interactive questionnaire session. The user's face may be attributed to a square shape with 0.5 probability, a round shape with 0.4 probability, and an oval shape with 0.1 probability. This fuzzy association describes the confusion between multiple attributes, and is important in deriving custom recommendation decision. However, none of the existing techniques provide an end to end solution for recommendation under such a scenario.

It is noted that at least some of the techniques are described herein in the context of product catalogs and/or databases and online recommendation systems, however, this is not intended to be limiting. For example, those skilled in the art will appreciate that these techniques are also applicable to filtering or identifying data in other contexts where attributes corresponding to a set of data are to be matched to user attributes, for example.

One or more illustrative embodiments include data filtering with fuzzy attribute association. At least one example embodiment includes a system for automatically determining mappings between user and product attributes (which are, for example, fuzzy in nature) in the context of a scope configured by an expert. For example, the system may determine the mapping by consuming expert knowledge associated with recommendation in the form of rules, wherein the rules are qualitative constraints. The system may verify the consistency of the specified rule set automatically, and also generate an interactive session with the expert to resolve conflicts in the specified rules. The system also consumes sales data or user choices along with the expert rules, and optimizes the rule weights to adjust the recommendations or re-ranks the user's query to best satisfy the observed data. The system may handle fuzzy user attribution or product attribution to generate consistent user specific product recommendations. For a set of user attributes in a given context, the system may produce comparative scores between different products.

Additionally, at least one exemplary embodiment includes providing a rule mapping engine that constrains associations based on expert knowledge, and automatically resolves fuzziness based on inferences from other sources, such as, for example, social media data and expert interactions.

FIG. 1 is a diagram illustrating system architecture, according to an embodiment of the invention. FIG. 1 includes an attribution space 104 that includes an initial set of user attributes 106 and an initial set of system attributes 108. The attributes 106, 108 may initially be defined, for example, by a system designer. As an example, if the system relates to eyewear then the system attributes 108 may include attributes associated with frame shape, frame color, and temple width; and the user attributes may include attributes associated with, for example, gender, age group, face shape, and complexion.

In the example shown in FIG. 1, an expert 124 generates rules 126 that provide an ordering of pairings between the user attributes 106 and the system attributes 108. In some embodiments, the rules 126 are partial in nature. For example, a given one of the rules 126 may specify an order (or ranking) of pairs of user attributes 106 and system attributes 108. Continuing the eyewear example above, a rule may specify that a square face shape and aviator frame shape pairing is ranked higher than a square face shape and square frame shape pairing. Such a pairing could be expressed as, for example: (square face shape; aviator frame shape)>(square face shape; square frame shape). According to some exemplary embodiments, the system 100 derives partial order lattices for different attributes pairings, as described in further detail herein.

The FIG. 1 embodiment also includes a constraint modeler 112 that receives the expert rules 126 and the attribute space 104 as input. The constraint modeler 112 validates the consistency of each set of rules provided by the expert 124. Additionally, the constraint modeler 112 obtains information for automatic constraint correction 122. The information 122 may include, for example, an image repository (e.g., collected from social media) and/or sales data with customer attribute details. The constraint modeler 112 uses this information 122 to automatically resolve missing or ambiguous rules. For rules that cannot be automatically resolved, constraint modeler 112 identifies the set of attribute pairs which suffer from logical conflicts or ambiguous ordering. In the example shown in FIG. 1, the constraint modeler 112 generates output, which may be, for example, in the form of a conversation with the expert 124. For example, the output may identify one or more of the set of attribute pairs which suffer from logical conflicts or ambiguous ordering, and pose these pairs in the form of a question to the expert 124. As such, the constraint modeler 112 may interactively resolve any conflict and/or ambiguities. The constraint modeler 112 then outputs an unambiguous ordering for all attribute pairings based on the attribute space 104. The ordering may be qualitative in nature.

The system 100 also includes an optimizer 114 that obtains the ordering of the attribute pairings. The optimizer 114 consumes sales data and/or social network data 128. The data 128 may be one or more of tabular data or unstructured image data, for example. The optimizer 114 generates rule model 116 by optimizing model parameters, for example, by deriving scores that best satisfy pattern(s) observed in the data 128, for example by optimizing system parameters. The optimizer outputs rule model 116, which is used to convert the partial ordering to a scoring scheme.

A user feature extractor 110 of the system 100 extracts one or more features for a given customer 102 using available information. For example, the available information may include, for example, browsing history data, uploaded data (e.g., photos), data from an interactive questionnaire, etc. The extracted features are provided as input to the rule engine 118 along with the data catalog 120 (e.g., a product catalog). For example, for the given customer 102 that is associated with all of the user attributes 102, and a product associated with all of the system attributes 108, the rule engine 118 produces a score. The rule engine 118 outputs one or more recommendations 130 of items in the data catalog based on the score. It is noted that the system 100 may produce a score even in the presence of fuzzy attribute associations.

Figure 2:
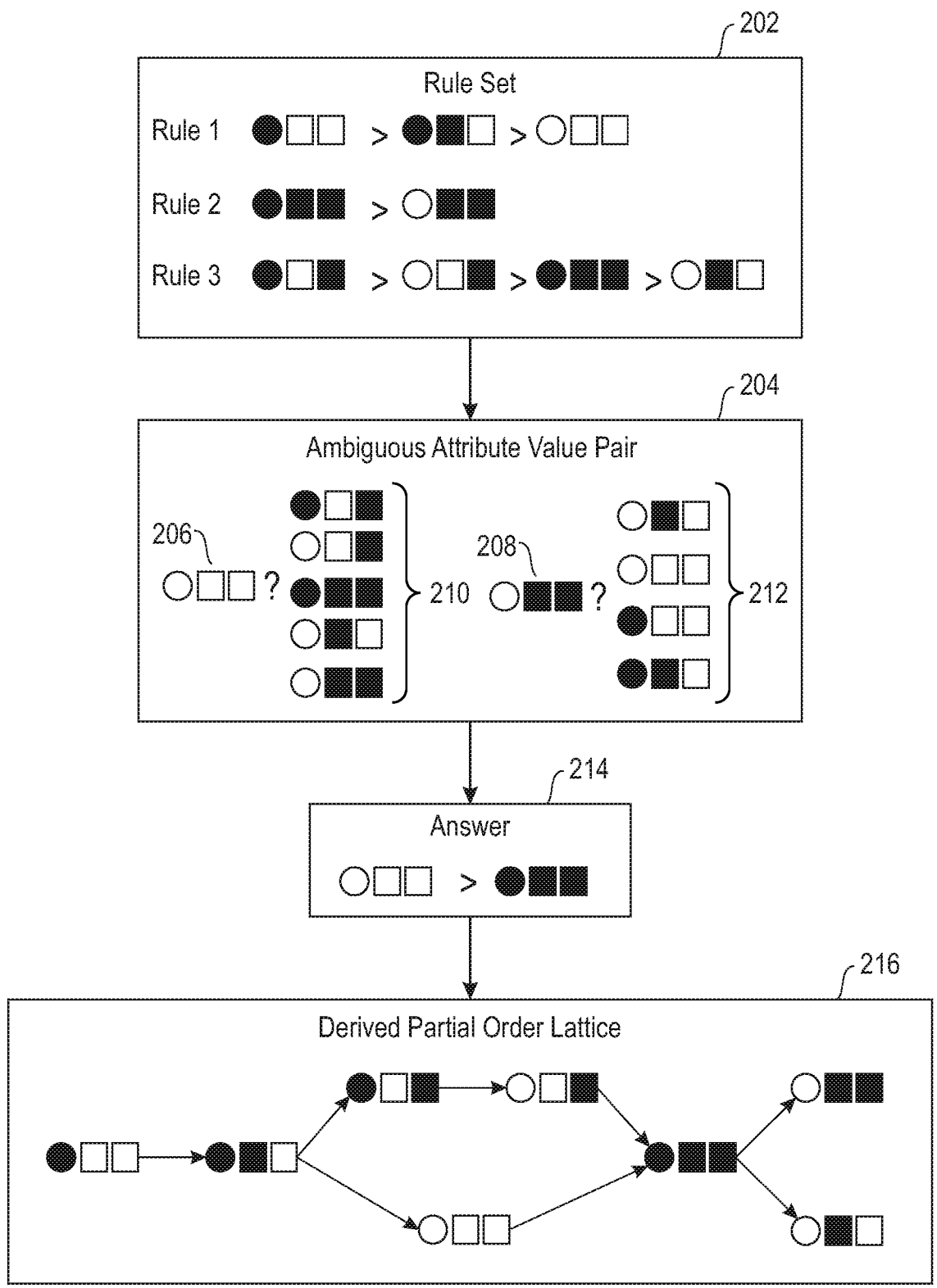
FIG. 2 is a diagram illustrating a process for interactive resolution of a lattice structure in accordance with exemplary embodiments.

Referring now to FIG. 2, this figure shows an example of interactive resolution of a lattice structure in accordance with exemplary embodiments. The interactive resolution may be implemented in system 100 of FIG. 1, for example. In the example shown in FIG. 2, customer attributes are depicted using circles, and product attributes are depicted using squares. Also, in this example, each product attribute and each user attribute may take one of two values; these values are depicted using light and dark shading. Rule set 202 includes Rules 1-3, which may be defined and input into the system by an expert, for example. The rules in rule set 202 define a partial ordering of pairs of customer attributes and product attributes. As an example, an expert may provide the rule set to the system, which may then identify ambiguous attribute value pairs 204 in the rule set 202. In the example shown in FIG. 2, two ambiguous attribute value pairs 206, 208 are determined based on the rule set 202. Each of the ambiguous candidate pairings 206, 208 may be output to the expert in the form of one or more questions. In the example shown in FIG. 2, the system generates questions for an expert to define a relationship between the attribute pairs 206, 208 and corresponding sets of candidate attribute pairs 210, 212. This is performed, for example, interactively with the expert. In this example, an answer 214 is provided that defines the relationship between pair 206 and one of the pairs from the set 210. The interactive answering session is used to derive the partial order lattice 216, which includes each attribute pair identified in the rule set 202.

Figure 3:
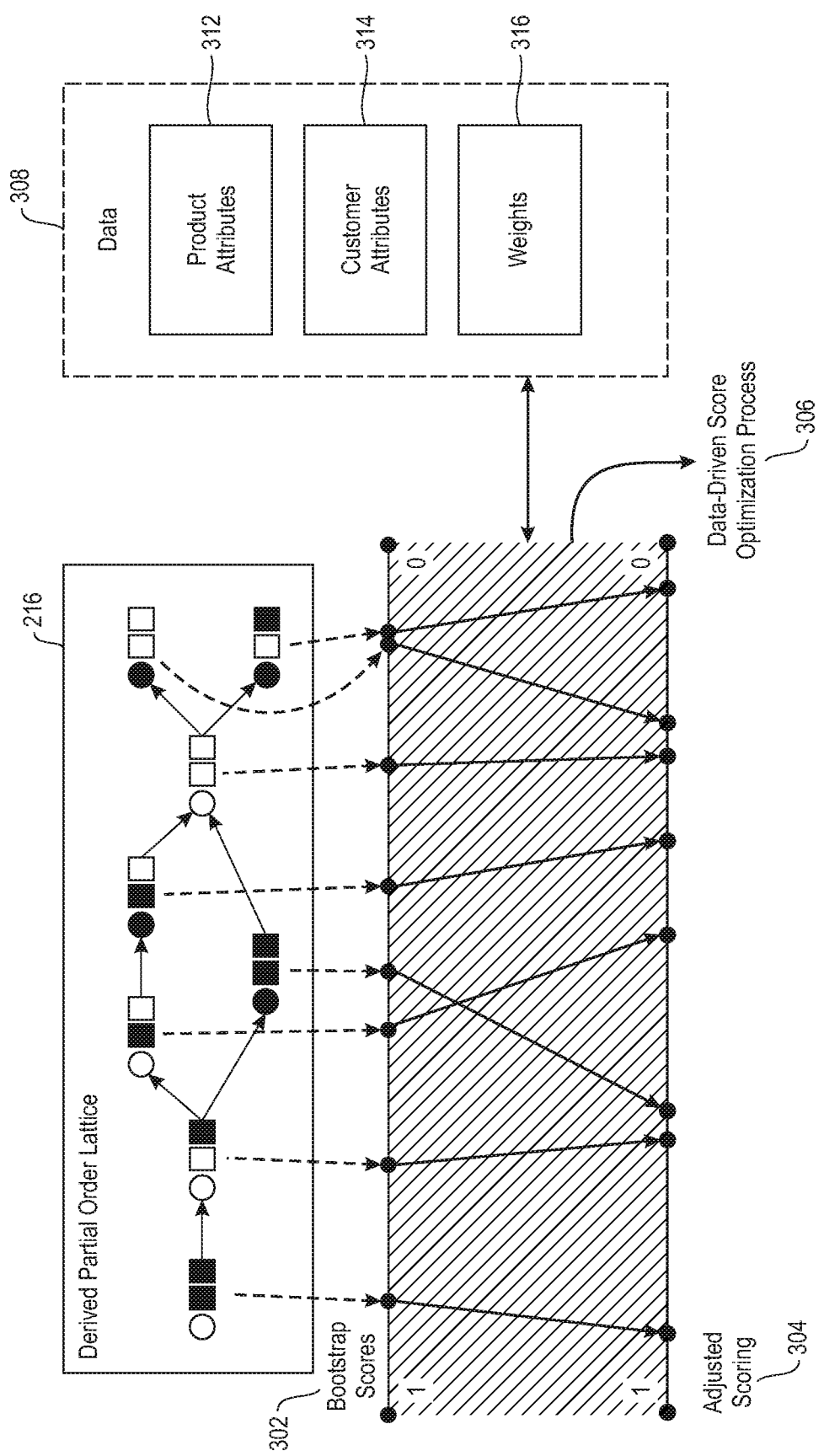
FIG. 3 is a diagram illustrating a process for data driven tuning of scoring in accordance with exemplary embodiments.

Referring also to FIG. 3, this figure shows data driven lattice-to-scores framework scores in accordance with an exemplary embodiment. In this example, the process derives bootstrap scores 302 for each attribute pair in the rule set 202 such that the bootstrap scores 302 satisfy the relationship defined in the derived partial order lattice 216. For example, each attribute pairing in the ruleset 202 may be obtained via a geometric optimization (e.g., maximizing separation between the attribute pair nodes of the lattice 216), as shown in FIG. 3. In case data 308 are provided (such as, for example, sales and social network data 128), the bootstrap scores 302 may be adjusted to obtain adjusted scores 304 using a data-driven score optimization process 306. For example, the data 308 may include product attributes 312, customer attributes 314, and weights 316 for particular pairings between the attributes 312, 314. The adjusted scores 304 scores are determined, for example, so that they best satisfy the attribute association given by the data 308 while maximizing separation between attribute pair nodes, for example.

According to an exemplary embodiment, a lattice-to-scores framework (such as that corresponding to FIG. 3, for example) may include deriving a score for each attribute pairing defined by a ruleset, $\sigma(\{A_{prod}\}, \{A_{customer}\})$, where score values are between (0,1). Each rule set is associated with a global weighting in the overall scoring, $\omega_{A_{prod}, A_{customer}}$. If weights are not specified, and if no data are provided for rule tuning, all rulesets are given an equal weight. A given score satisfies the relationship derived from a lattice (e.g., lattice 216). If no data are given, the score for each attribute pairing for each of the rulesets may be obtained via geometric optimization (i.e., maximizing the separation between the attribute pair nodes). If data are available, both $\omega$ and $\sigma$ are adjusted to best satisfy the attribute association given by the data, along with separation maximization. To bound the optimization problem $\Sigma \omega_i$ may be set to 1.0 and $0 \leq \sigma \leq 1$.

The order of the lattice may define the predecessor and descendant relationship between attribute pairs. For example, let R be a ruleset, where $R_p$ describes a set of product attributes and $R_c$ describes a set customer attributes that are associated in the ruleset description. The set of predecessor nodes of the attribute pair $R_p^i, R_c^i$ is denoted by $\rho(R_p^i, R_c^i)$. In this example, the goal is to derive a scoring for each attribute pair given a complete ruleset $\sigma(R_p^i, R_c^i)$. To create a bounded formulation, an auxiliary start (S) node and auxiliary end (E) node are appended (i.e., $\sigma(S)=0$ and $\sigma(E)=1$). The distance geometry scoring may be provided by the following equation:

$$\text{minimize } \Sigma_i \Sigma_{u \in \rho(R_p^i, R_c^i)} (\sigma(R_p^i, R_c^i) - u)^2$$

To derive the aggregate scoring, each rule set (R) has a linear importance given as $\gamma_R$. Given a customer and product attribute pair, $(\langle P \rangle, \langle C \rangle)$, the final scoring is derived as follows:

$$\bar{s} = \Sigma_{r \in R} \gamma_r \times \sigma(r_P, r_C)$$

This model may handle scoring of fuzzy attributes association. Specifically, if we let $(\langle P, \Pi_p \rangle, \langle C, \Pi_c \rangle)$ represent the fuzzy attribute association then the final scoring may be derived as follows:

$$\bar{s} = \Sigma_{r \in R} \gamma_r \Sigma_{\pi_c} \Sigma_{\pi_p} \sigma(r \langle_P \rangle, r \langle_C \rangle)$$

One or more exemplary embodiments include learning optimized system parameters, $\gamma_R$, $\sigma(R_p^i, R_c^i)$, from data (such as, for example, sales and social network data 128). As an example, given data $(\overline{D} = \{\langle P_i, \Pi_{P,i}, C_i, \Pi_{C,i}, w_i \rangle\})$ that describes attribute associations, the total weighted score may be provided by the following equation:

$$\bar{s} = \Sigma_i \Sigma_{r \in R} \gamma_r \Sigma_{\pi_{c_i}} \Sigma_{\pi_{p_i}} \sigma(r \langle_{P_i} \rangle, r \langle_{C_i} \rangle)$$

For regularization, the final optimization function may incorporate geometric regularization, as provided by the following equation:

$$f = \Sigma_i \Sigma_{r \in R} \gamma_r \Sigma_{\pi_{c_i}} \Sigma_{\pi_{p_i}} \sigma(r \langle_{P_i} \rangle, r \langle_{C_i} \rangle) - \lambda \Sigma_{r \in R} \Sigma_j \Sigma_{u \in \rho(R_p^i, R_c^i)} \sigma(R_p^j, R_c^j) - u)^2$$

The optimization is a constrained optimization problem, where the constraints are derived from the lattice structure for each rule for $\sigma$ scores and $\Sigma \gamma_R = 1$. Next, as the final problem is posed as a weighted score maximization problem, the weights for each sample may be derived using one or more of sale value and market sentiment.

Figure 4:
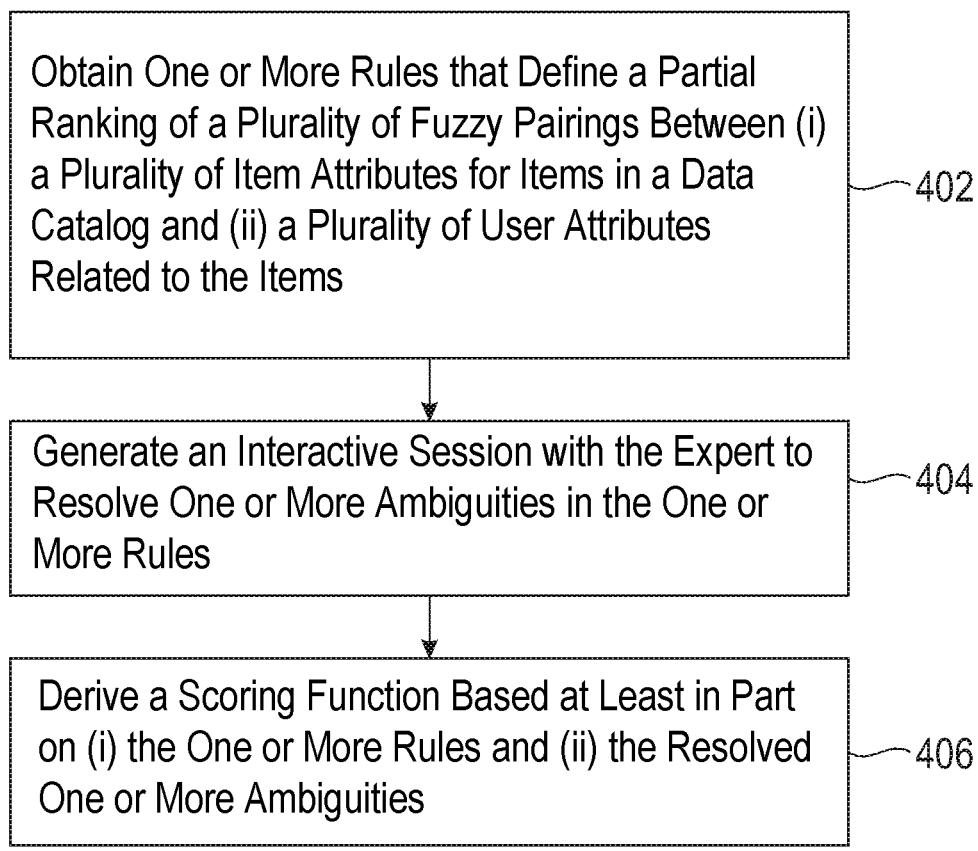
FIG. 4 is a flow diagram illustrating techniques according to an embodiment of the invention.

FIG. 4 is a flow diagram illustrating techniques according to an embodiment of the present invention. Step 402 includes obtaining one or more rules, specified by an expert, that define a partial ranking of a plurality of fuzzy pairings between (i) a plurality of item attributes for items in a data catalog and (ii) a plurality of user attributes related to said items. Step 404 includes generating an interactive session with the expert to resolve one or more ambiguities in the at least one set of rules. Step 406 includes deriving a scoring function based at least in part on (i) the one or more rules and (ii) the resolved one or more ambiguities, wherein the scoring function generates a comparative score between any two items of said data catalog for a given one of the users associated with the plurality of attributes.

The process depicted in FIG. 4 may include a step of determining fuzzy associations between the items and at least one of the item attributes and/or determining fuzzy associations between one or more users and at least one of the user attributes.

Each of the fuzzy associations may include a probability distribution. A given one of the fuzzy pairings may include a unique combination of (i) at least one value for a given one of the item attributes and (ii) at least one value for a given one of the one or more user attributes. At least a portion of the item attributes may be associated with a plurality of values. At least a portion of the user attributes may be associated with a plurality of values. Deriving the scoring function may include: optimizing said scoring function based on one or more of (i) sales data and (ii) social network data. The process depicted in FIG. 4 may include a step of attempting to automatically resolve the one or more ambiguities based on one or more of: (i) the sales data and (ii) the social network data. The sales data may include information corresponding to one or more of the user attributes. The social network data may include a set of images. Deriving the scoring function may include: generating a lattice structure that defines both a predecessor relationship and a descendant relationship between the plurality of fuzzy pairings based on the partial ranking. Generating the interactive session may include: automatically generating one or more queries to be output to the expert, wherein each of the queries comprises one or more of the fuzzy pairings that are associated with at least one of the ambiguities. The process depicted in FIG. 4 may include a step of: outputting, to the user, recommendations comprising one or more of the items based on the scoring function, wherein the recommendations are consistent across said one or more users.

According to another example embodiment, a method may include: ranking, using a set of rules, pairs of (i) item attributes related to items in a data catalog and (ii) customer attributes related to said items, wherein one or more of the items have a fuzzy association with at least a portion of the item attributes; determining one or more logical issues in the ranking resulting from at least one of (i) the set of rules being incomplete and (ii) one or more ambiguities in the set of rules; generating output related to said one or more logical issues via a graphical user interface; resolving said one or more logical issues based on input from a user in response to said output; and deriving a scoring function based at least in part on said set of rules and said resolved one or more logical issues, wherein the scoring function generates a comparative score between any two items of said data catalog for a given set of values for the customer attributes.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
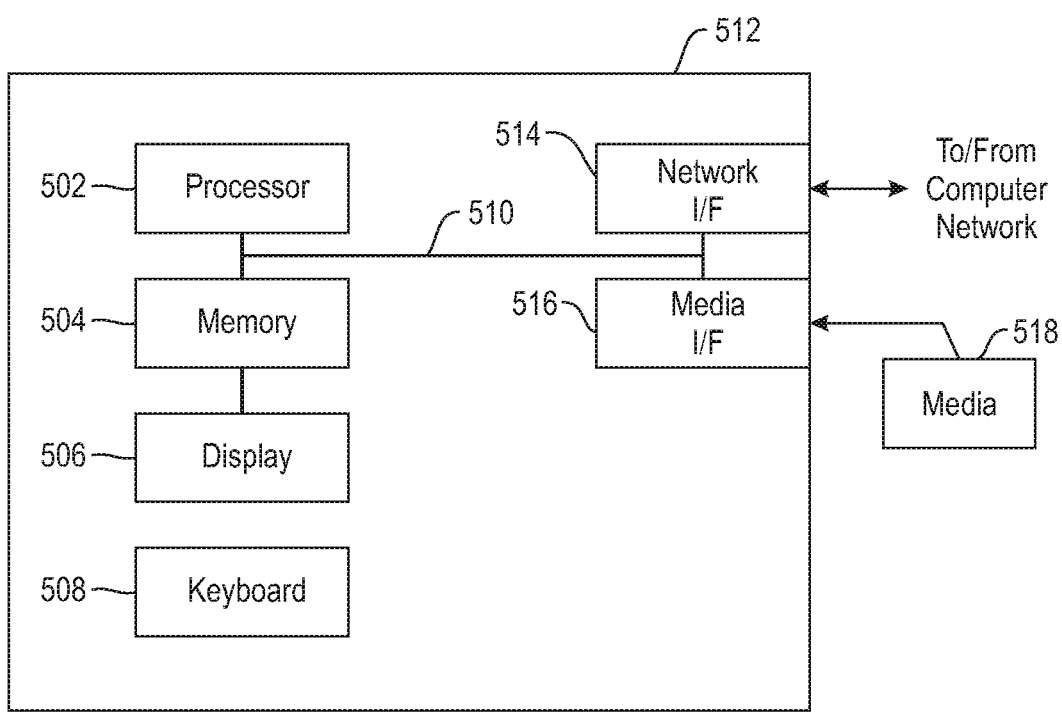
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor.

The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
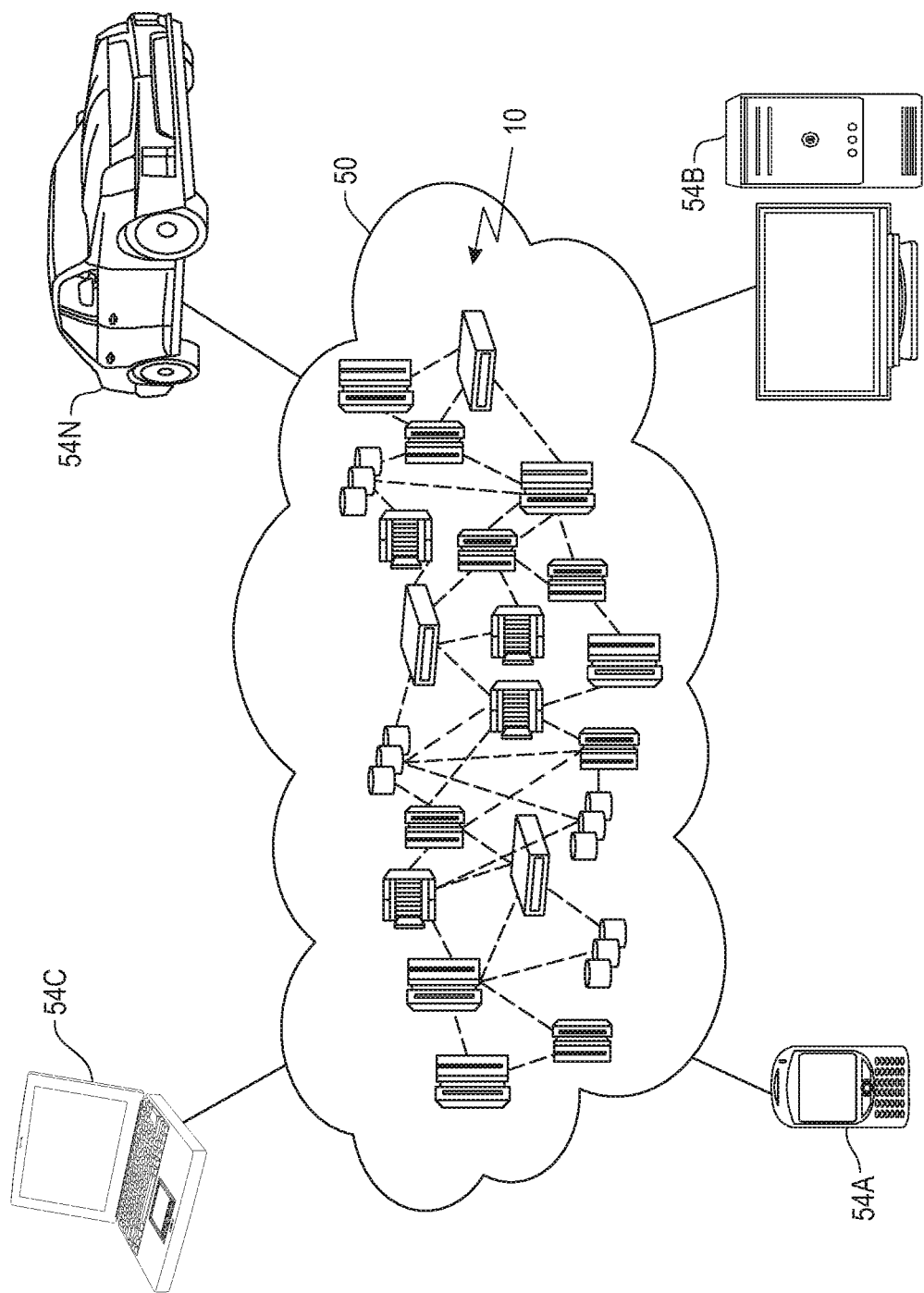
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
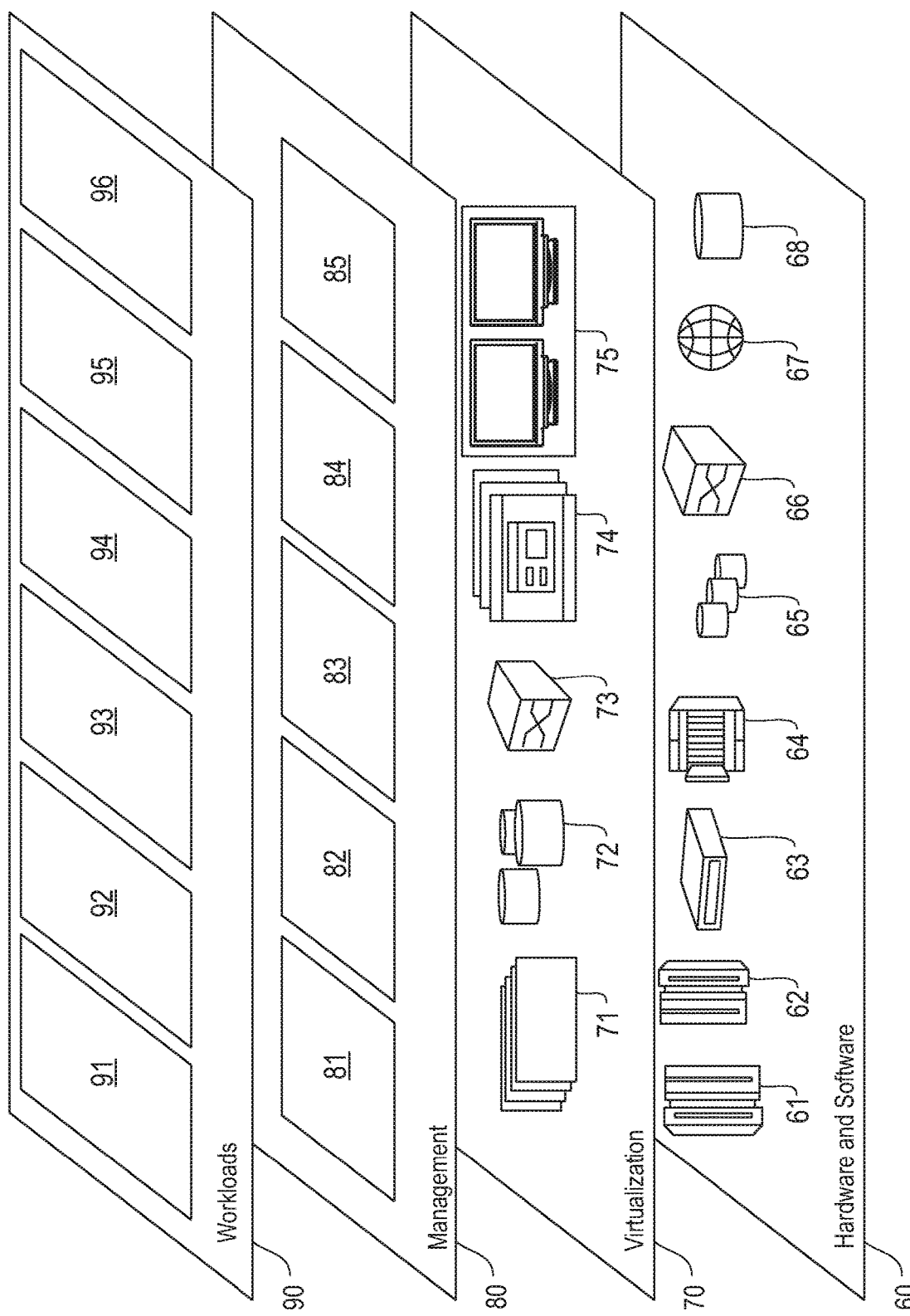
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data filtering with fuzzy attribute association 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one exemplary embodiment may provide a beneficial effect such as, for example, automatic resolution of inconsistencies from expert provided rules. Also, at least one exemplary embodiment provides a beneficial effect such as, for example, allowing usage of both knowledge from the sales data, and expert opinion in the same framework. Further, one or more exemplary embodiments provides a beneficial effect such as, for example, automatically resolving fuzzy product or customer feature assignments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

obtaining one or more rules, specified by a first user, that define a partial ranking of a plurality of pairings between a plurality of item attributes for items in a data catalog and a plurality of user attributes related to said items, wherein at least one of the pairings comprises a probability distribution between one of the items and multiple item attributes;

generating an interactive session with the first user to resolve one or more ambiguities in the one or more rules, wherein the interactive session comprises: automatically generating and outputting one or more queries corresponding to one or more of the pairings that are associated with at least one of the ambiguities; and generating a lattice data structure based on input received from the first user in response to the one or more queries, wherein the lattice data structure indicates a respective relationship between each of the plurality of pairings; and deriving, using the lattice data structure, a scoring function based at least in part on the one or more rules and the resolved one or more ambiguities, wherein the scoring function generates a comparative score between any two items of said data catalog for at least one second user associated with the plurality of user attributes;

wherein the method is carried out by at least one computing device.

2. The computer-implemented method of claim 1, comprising:

determining the probability distribution between the one of the items and the and the multiple item attributes.

3. The computer-implemented method of claim 1, wherein a given one of the plurality of pairings comprises a unique combination of at least one value for a given one of the item attributes and at least one value for a given one of the one or more user attributes.

4. The computer-implemented method of claim 1, wherein at least one of: at least a portion of the item attributes are associated with a plurality of values and at least a portion of the user attributes are associated with a plurality of values.

5. The computer-implemented method of claim 1, wherein said deriving comprises:

improving said scoring function based on one or more of sales data and social network data.

6. The computer-implemented method of claim 5, comprising:

attempting to automatically resolve the one or more ambiguities based on one or more of: the sales data and the social network data.

7. The computer-implemented method of claim 5, wherein the sales data comprises information corresponding to one or more of said user attributes.

8. The computer-implemented method of claim 5, wherein the social network data comprise a set of images.

9. The computer-implemented method of claim 5, wherein the lattice data structure defines both a predecessor relationship and a descendant relationship between the plurality of pairings based on the partial ranking.

10. The computer-implemented method of claim 1, wherein each of the queries comprises one or more of the plurality of pairings that are associated with at least one of the ambiguities.

11. The computer-implemented method of claim 1, comprising:
outputting, to the at least one second user, recommendations comprising one or more of the items based on the scoring function, wherein the at least one second user comprises a plurality of second users and the recommendations are consistent across a plurality of the second users.

12. A computer program product comprising a computer readable storage medium having program instructions embodied therewith, the program instructions executable by a computing device to cause the computing device to:
obtain one or more rules, specified by a first user, that define a partial ranking of a plurality of pairings between a plurality of item attributes for items in a data catalog and a plurality of user attributes related to said items, wherein at least one of the pairings comprises a probability distribution between one of the items and multiple item attributes;
generate an interactive session with the first user to resolve one or more ambiguities in the one or more rules, wherein the interactive session comprises: automatically generating and outputting one or more queries corresponding to one or more of the pairings that are associated with at least one of the ambiguities; and generating a lattice data structure based on input received from the first user in response to the one or more queries, wherein the lattice data structure indicates a respective relationship between each of the plurality of pairings; and
derive, using the lattice data structure, a scoring function based at least in part on the one or more rules and the resolved one or more ambiguities, wherein the scoring function generates a comparative score between any two items of said data catalog for at least one second user associated with the plurality of user attributes.

13. The computer program product of claim 12, wherein the program instructions are executable by the computing device to cause the computing device to:
determine the probability distribution between one of the items and the and the multiple item attributes.

14. The computer program product of claim 12, wherein a given one of the plurality of pairings comprises a unique combination of at least one value for a given one of the item attributes and at least one value for a given one of the one or more user attributes.

15. The computer program product of claim 12, wherein at least one of: at least a portion of the item attributes are associated with a plurality of values and at least a portion of the user attributes are associated with a plurality of values.

16. The computer program product of claim 12, wherein said deriving comprises:
improving said scoring function based on one or more of sales data and social network data.

17. The computer program product of claim 12, wherein each of the queries comprises one or more of the plurality of pairings that are associated with at least one of the ambiguities.

18. A system comprising:
a memory; and
at least one processor operably coupled to the memory and configured for:
obtaining one or more rules, specified by a first user, that define a partial ranking of a plurality of pairings between a plurality of item attributes for items in a data catalog and a plurality of user attributes related to said items, wherein at least one of the pairings comprises a probability distribution between one of the items and multiple item attributes;
generating an interactive session with the first user to resolve one or more ambiguities in the one or more rules, wherein the interactive session comprises: automatically generating and outputting one or more queries corresponding to one or more of the pairings that are associated with at least one of the ambiguities; and generating a lattice data structure based on input received from the first user in response to the one or more queries, wherein the lattice data structure indicates a respective relationship between each of the plurality of pairings; and
deriving, using the lattice data structure, a scoring function based at least in part on the one or more rules and the resolved one or more ambiguities, wherein the scoring function generates a comparative score between any two items of said data catalog for at least one second user associated with the plurality of user attributes.

19. The system of claim 18, wherein the at least one processor operably coupled to the memory is further configured for:
determining the probability distribution between the one of the items and the and the multiple item attributes.

20. The system of claim 18, wherein a given one of the plurality of pairings comprises a unique combination of at least one value for a given one of the item attributes and at least one value for a given one of the one or more user attributes.

* * * * *